US010459582B2

(12) United States Patent
Kim et al.

(10) Patent No.: US 10,459,582 B2
(45) Date of Patent: Oct. 29, 2019

(54) TOUCH SENSOR AND METHOD OF MANUFACTURING THE SAME

(71) Applicant: DONGWOO FINE-CHEM CO., LTD., Jeollabuk-do (KR)

(72) Inventors: Sang Kook Kim, Gyeonggi-do (KR); Sung Hoon Cho, Gyeonggi-do (KR); Min Hyuk Park, Gangwon-do (KR); Seung June Park, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 0 days.

(21) Appl. No.: 15/811,907

(22) Filed: Nov. 14, 2017

(65) Prior Publication Data

US 2018/0136754 A1 May 17, 2018

(30) Foreign Application Priority Data

Nov. 15, 2016 (KR) .................. 10-2016-0151908

(51) Int. Cl.
- *G06F 3/044* (2006.01)
- *G02F 1/1333* (2006.01)
- *G06F 3/041* (2006.01)

(52) U.S. Cl.
CPC .......... *G06F 3/044* (2013.01); *G02F 1/13338* (2013.01); *G06F 3/0412* (2013.01); *G06F 3/0416* (2013.01); *G06F 2203/04103* (2013.01); *G06F 2203/04111* (2013.01); *G06F 2203/04112* (2013.01)

(58) Field of Classification Search
CPC ...... G06F 3/044; G06F 3/0412; G06F 3/0416; G06F 2203/04111; G06F 2203/04103; G06F 2203/04112; G02F 1/13338
See application file for complete search history.

(56) References Cited

U.S. PATENT DOCUMENTS

| | | | | |
|---|---|---|---|---|
| 2004/0265602 A1* | 12/2004 | Kobayashi | ............... | B32B 7/02 428/458 |
| 2013/0134993 A1* | 5/2013 | Takao | ................... | G06F 3/044 324/661 |
| 2014/0184934 A1* | 7/2014 | Park | ...................... | G06F 3/044 349/12 |
| 2014/0333578 A1* | 11/2014 | Wu | ........................ | G06F 3/041 345/174 |

(Continued)

FOREIGN PATENT DOCUMENTS

| | | |
|---|---|---|
| JP | 2012-160203 A | 8/2012 |
| KR | 10-2011-0027297 A | 3/2011 |

(Continued)

OTHER PUBLICATIONS

Office action dated Jan. 7, 2019 from Korean Patent Office in a counterpart Korean Patent Application No. 10-2016-0151908 (English translation is submitted herewith.).

*Primary Examiner* — Brent D Castiaux
(74) *Attorney, Agent, or Firm* — The PL Law Group, PLLC

(57) ABSTRACT

A touch sensor includes a plurality of electrode patterns, an optical adjusting layer interposed between the electrode patterns, and an insulation layer at least partially covering the electrode patterns and the optical adjusting layer. The insulation layer may have a refractive index less than that of the optical adjusting layer.

14 Claims, 2 Drawing Sheets

(56) References Cited

U.S. PATENT DOCUMENTS

2015/0346866 A1* 12/2015 Kusunoki ............... G06F 3/044
                                                    345/174
2016/0077368 A1*  3/2016 Kim ................... G02F 1/13338
                                                    349/12
2016/0274695 A1*  9/2016 Ando ...................... G06F 3/044

FOREIGN PATENT DOCUMENTS

| KR | 10-2014-0092366 A | 7/2014 |
| KR | 10-2014-0123438 A | 10/2014 |
| KR | 101586740 B1 | 1/2016 |

* cited by examiner

TOUCH SENSOR AND METHOD OF MANUFACTURING THE SAME

CROSS-REFERENCE TO RELATED APPLICATION AND CLAIM OF PRIORITY

This application claims priority to Korean Patent Application No. 10-2016-0151908 filed on Nov. 15, 2016 in the Korean Intellectual Property Office (KIPO), the entire disclosure of which is incorporated by reference herein.

BACKGROUND

1. Field

The present invention relates to a touch sensor and a method of manufacturing the same. More particularly, the present invention relates to a touch sensor including a plurality of conductive patterns and an insulating structure and a method of manufacturing the same.

2. Description of the Related Art

As information technologies have been rapidly developed, various demands for slim, light-weighted and eco-friendly display devices are increasing. For example, a flat panel display device such as a liquid crystal display device, a plasma display panel device, an electro luminescent display device, an organic light emitting diode display device, etc., has been developed to meet the demands.

Further, a touch panel which is an input device configured to transfer a user's instruction by selecting an object demonstrated on a display plane of the display device with a human hand or an additional input tool has been also highlighted. The touch panel may be disposed at a front face of the display device so that image display and information input may be implemented in one electronic device.

As the display device becomes thinner, a flexible property, e.g., bendable or foldable properties may be realized. Thus, the touch panel capable of being properly employed in a flexible display device may be needed.

If the touch panel is inserted in the display device, an image quality may be degraded due to electrode patterns included in the touch panel. Thus, an optical property of the touch panel may be also required together with the flexible property.

For example, Korean Patent Laid-Open Publication No 2014-0092366 discloses a touch screen panel combined with an image display device. However, demands of a thinner touch sensor or touch panel having improved optical properties are continuously increasing.

SUMMARY

According to an aspect of the present invention, there is provided a touch sensor having improved optical and flexible properties.

According to an aspect of the present invention, there is provided a method of manufacturing a touch sensor having improved optical and flexible properties.

According to an aspect of the present invention, there is provided an image display device including the touch sensor.

The above aspects of the present inventive concepts may be achieved by, for example, one or more of the following technical features or constructions:

(1) A touch sensor, comprising a plurality of electrode patterns; an optical adjusting layer interposed between the electrode patterns; and an insulation layer at least partially covering the electrode patterns and the optical adjusting layer, the insulation layer having a refractive index less than that of the optical adjusting layer.

(2) The touch sensor according to the above (1), wherein the optical adjusting layer includes a lower layer and a protrusion.

(3) The touch sensor according to the above (2), wherein the electrode patterns are disposed on the lower layer and are isolated with respect to the protrusion.

(4) The touch sensor according to the above (2), wherein the lower layer and the protrusion are integrally connected to each other.

(5) The touch sensor according to the above (2), wherein the optical adjusting layer includes a plurality of the protrusions, and a recess is defined by a top surface of the lower layer and neighboring ones of the protrusions.

(6) The touch sensor according to the above 5, wherein each of the electrode patterns is disposed in the recess.

(7) The touch sensor according to the above (2), wherein the optical adjusting layer includes a plurality of the protrusions, and the electrode patterns are surrounded at least partially by the protrusions.

(8) The touch sensor according to the above (1), wherein the optical adjusting layer includes patterns isolated from each other and interposed between the electrode patterns.

(9) The touch sensor according to the above (1), wherein the optical adjusting layer includes an inorganic particle dispersed in an organic binder.

(10) The touch sensor according to the above (1), wherein a refractive index difference between the electrode pattern and the optical adjusting layer is 0.3 or less.

(11) The touch sensor according to the above (10), wherein a refractive index difference between the electrode pattern and the insulation layer is 0.3 or more.

(12) The touch sensor according to the above (1), wherein the electrode patterns include first sensing electrodes and second sensing electrode arranged along different direction crossing each other.

(13) The touch sensor according to the above (12), further comprising a bridge electrode electrically connecting neighboring ones of the first sensing electrodes while insulating the first sensing electrodes from the second sensing electrodes.

(14) The touch sensor according to the above (13), wherein the bridge electrode is disposed on the insulation layer.

(15) The touch sensor according to the above (1), further comprising a transparent substrate on which the optical adjusting layer is formed.

(16) The touch sensor according to the above (1), further comprising a protective layer and a separation layer sequentially formed from a bottom surface of the optical adjusting layer.

(17) The touch sensor according to the above (1), wherein a thickness of the optical adjusting layer between the electrode patterns is in a range from 80% to 140% of a thickness of the electrode pattern.

(18) A touch sensor, comprising an optical adjusting layer including a lower layer and a protrusion; electrode patterns isolated with respect to the protrusion on the optical adjusting layer; and an insulation layer at least partially covering the electrode patterns and the optical adjusting layer.

(19) The touch sensor according to the above (18), wherein the optical adjusting layer has a refractive index greater than that of the insulation layer.

(20) An image display device comprising the touch sensor according to claim 1.

According to exemplary embodiments, an optical adjusting layer having a refractive index closer to that of electrode patterns may be formed between the electrode patterns of a touch sensor. Thus, a refractive index difference between the electrode pattern and another member at the same level of the electrode pattern may be reduced, so that a transmittance of the touch sensor may be increased, and the electrode pattern may be prevented from being viewed by a user.

Further, a protrusion integrally formed with the optical adjusting layer may be interposed between the electrode patterns. Thus, a refractive index matching with the electrode patterns may be realized, and the refractive index difference due to interlayer structures may be reduced.

DETAILED DESCRIPTION

According to an exemplary embodiment, a touch sensor comprising an optical adjusting layer, electrode patterns on the optical adjusting layer and an insulation layer at least partially covering the electrode patterns is provided. The optical adjusting layer includes a protrusion inserted between the electrode patterns, and an optical property such as a transmittance may be improved by the protrusion.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
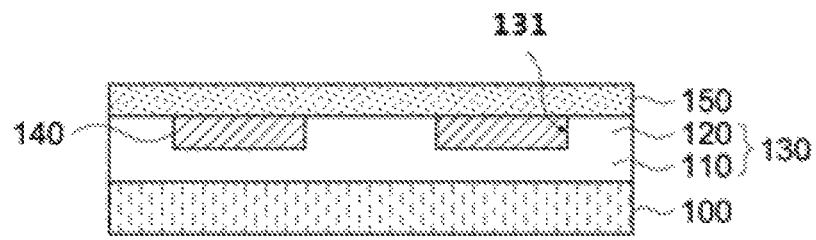
FIG. 1 is a schematic cross-sectional view illustrating a touch sensor in accordance with an exemplary embodiment.

FIG. 1 is a schematic cross-sectional view illustrating a touch sensor in accordance with an exemplary embodiment. Referring to FIG. 1, the touch sensor may include a substrate 100, an optical adjusting layer 130, an electrode pattern 140 and an insulation layer 150.

The substrate 100 may include a film or a base layer for forming the optical adjusting layer 130 and the electrode pattern 140. For example, the substrate 100 may be formed of a base material including glass, a polymer and/or an inorganic insulation material commonly used in the touch sensor. The polymer may include, e.g., cyclo olefin polymer (COP), polyethylene terephthalate (PET), polyacrylate (PAR), polyether imide (PEI), polyethylene naphthalate (PEN), polyphenylene sulfide (PPS), polyallylate, polyimide (PI), cellulose acetate propionate (CAP), polyether sulfone (PES), cellulose triacetate (TAC), polycarbonate (PC), cyclo olefin copolymer (COC), polymethyl methacrylate (PMMA), etc. The inorganic insulation material may include, e.g., silicon oxide, silicon nitride, silicon oxynitride, a metal oxide, etc.

In some embodiments, the substrate 100 may serve as an encapsulation substrate or a passivation substrate of a display device or a display panel.

The optical adjusting layer 130 may be formed on the substrate 100, and may include a lower layer 110 and a protrusion 120. The optical adjusting layer 130 may be formed to provide a refractive index matching with the electrode pattern 140 to improve optical properties (e.g., a transmittance) of the touch sensor.

The lower layer 110 of the optical adjusting layer 130 may cover the substrate 100, and may serve substantially as a supporting layer for the electrode pattern 140. The protrusion 120 may be integral with the lower layer 110, and may protrude from the lower layer 110. For example, the protrusion 120 may have a bump shape, a fence shape or a pillar shape protruding from the lower layer 110.

In some embodiments, a plurality of the protrusion 120 may be formed from the lower layer 110, and a recess 131 may be defined by neighboring sidewalls of the protrusions 120, and a top surface of the lower layer 110 between the sidewalls.

The optical adjusting layer 130 may include an inorganic insulation material or an organic insulation material. In some embodiments, the optical adjusting layer 130 may be formed by a photo-curable composition including a photo-curable organic binder and a solvent on the substrate 100. The photo-curable composition may further include an inorganic particle. A refractive index of the optical adjusting layer 130 may be increased by the inorganic particle.

The photo-curable organic binder may include, e.g., a copolymer of an acrylate-based monomer, a styrene-based monomer, a carboxylic acid-based monomer, etc. The photo-curable organic binder may include different repeating units such as an epoxy repeating unit, an acrylate repeating unit, a carboxylic acid repeating unit, etc.

The inorganic particle may include, e.g., a zirconia particle, a titania particle, an alumina particle, etc.

The photo-curable composition may further include an additive such as a photo-initiator, a polymerizable monomer, a curing accelerator, etc.

According to an exemplary embodiment, the optical adjusting layer 130 may be formed by a half-tone exposure process. For example, the photo-curable composition may be coated on the substrate 100 to form a preliminary optical adjusting layer, and then the half-tone exposure process may be performed. Accordingly, an upper portion of the preliminary optical adjusting layer may be partially removed to form the protrusion 120 and/or the recess 131. A developing process may be performed after the half-tone exposure process so that the upper portion of the preliminary optical adjusting layer may be removed.

The photo-curable composition may be coated by, e.g., a slit coating, a knife coating, a spin coating, a casting, a micro gravure coating, a gravure coating, a bar coating, a roll coating, a wire bar coating, a deep coating, a spray coating, a screen printing, a gravure printing, a flexo printing, an offset printing, an inkjet coating, a dispenser printing, a nozzle coating, a capillary tube coating, etc.

The electrode pattern 140 may be formed on the optical adjusting layer 130, and may be disposed between the neighboring protrusions 120. In some embodiments, the electrode pattern 140 may be inserted in the recess 131. In this case, the electrode pattern 140 may be embedded in the optical adjusting layer 130.

According to an exemplary embodiment, a plurality of the electrode patterns 140 may be arranged on the lower layer 110 of the optical adjusting layer 130, and at least some of the electrode patterns 140 may be physically isolated from each other by the protrusion 120. Accordingly, the electrode pattern 140 and the protrusion 120 may be disposed at substantially the same level or the same layer of the touch sensor.

The electrode pattern 140 may include a plurality of sensing electrodes, and the sensing electrodes may include first sensing electrodes and second sensing electrodes arranged along different directions crossing each other. For example, the first sensing electrode and the second sensing electrode neighboring each other may be isolated by the protrusion 120.

The electrode pattern 140 may include, e.g., a transparent conductive material. The transparent conductive material may include indium tin oxide (ITO), indium zinc oxide (IZO), zinc oxide (ZnO), indium zinc tin oxide (IZTO), cadmium tin oxide (CTO), a metal wire, etc. These may be used alone or in a combination thereof. In some embodiments, the electrode pattern 140 may include ITO. The electrode pattern 140 may also include a metal such as silver, gold, aluminum, copper, iron, nickel, titanium, tellurium, chromium, or an alloy thereof.

According to an exemplary embodiment, a thickness of the protrusion 120 in the optical adjusting layer 130 may be in a range from about 80% to about 140% of a thickness of the electrode pattern 140. When the thickness of the protrusion 120 is not within the above range, a transmittance difference between an electrode region including the electrode pattern 140 and a non-electrode region including the protrusion 120 may become excessively larger to degrade an entire transmittance of the touch sensor and cause a visibility of the electrode pattern 140. Preferably, the thickness of the protrusion may be in a range from about 80% to 120% of the thickness of the electrode pattern 140 in consideration of fabrication a thin planar touch sensor.

In some embodiments, a refractive index difference between the electrode pattern 140 and the protrusion 120 (or the optical adjusting layer 130) may be about 0.3 or less. If the refractive index difference exceeds about 0.3, the transmittance of the touch sensor may be excessively decreased and the electrode pattern 140 may become visible by a user. For example, the electrode pattern 140 may include ITO and may have a refractive index from about 1.8 to about 2.0. A refractive index of the optical adjusting layer 130 may be at least about 1.6

As described above, the optical adjusting layer 130 may include the inorganic particle so that the refractive index of the optical adjusting layer 130 may be increased to be close to the refractive index of the electrode pattern 140.

The insulation layer 150 may be formed on the electrode pattern 140 and the protrusion 120 of the optical adjusting layer 130. The insulation layer 150 may at least partially cover the electrode pattern 140 and the protrusion 120.

The insulation layer 150 may be formed of a transparent insulation material. For example, the insulation layer 150 may be formed of an inorganic insulation material such as silicon oxide, or a transparent organic material such as an acryl-based resin.

The refractive index of the insulation layer 150 may be less than that of the optical adjusting layer 130 including the protrusion 120. For example, a refractive index difference between the electrode pattern 140 and the insulation layer 150 may be greater than about 0.3

According to an exemplary embodiment as described above, the insulation layer 150 including the transparent insulation material may be disposed on the electrode pattern 140, and the optical adjusting layer 130 having the refractive index closer to that of the electrode pattern 140 may be disposed at the same level as that of the electrode pattern 140 by the protrusion 120.

Thus, the refractive index difference between the electrode pattern 140 and a structure at the same level of the electrode pattern 140 may be reduced so that the transmittance of the touch sensor may be improved and the electrode pattern 140 may be prevented from being visually seen by the user. Therefore, optical properties of the touch sensor may be enhanced.

Additionally, the protrusion 120 may be integrally formed with the lower layer 110 so that a refractive index change and a transmittance reduction at an interface between layers may be prevented.

Figure 2:
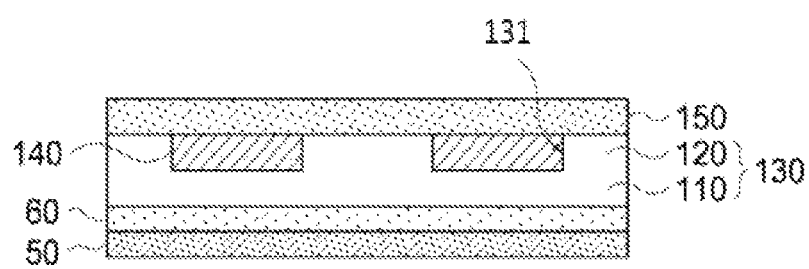
FIG. 2 is a schematic cross-sectional view illustrating a touch sensor in accordance with an exemplary embodiment.

FIG. 2 is a schematic cross-sectional view illustrating a touch sensor in accordance with an exemplary embodiment. For example, FIG. 2 illustrates a film-type or a substrate-less type touch sensor. Detailed descriptions on elements or materials substantially the same as or similar to those described with reference to FIG. 1 are omitted herein.

Referring to FIG. 2, the touch sensor may include an optical adjusting layer 130, an electrode pattern 140 and an insulation layer 150. In some embodiments, the electrode pattern 140 may be formed on a lower layer 110 of the optical adjusting layer 130, and may be at least partially surrounded by protrusions 120 of the optical adjusting layer 130.

A separation layer 50 and a protective layer 60 may be disposed under the optical adjusting layer 130. In an exemplary embodiment, the protective layer 60 may be formed on the separation layer 50, and the optical adjusting layer 130, the electrode pattern 140 and the insulation layer 150 may be sequentially formed on the protective layer 60.

The separation layer 60 may include a polymer organic layer. The separation layer 60 may include, e.g., a polyimide-based polymer, a poly vinyl alcohol-based polymer, a polyamic acid-based polymer, a polyamide-based polymer, a polyethylene-based polymer, a polystyrene-based polymer, a polynorbornene-based polymer, a phenylmaleimide copolymer-based polymer, a polyazobenzene-based polymer, a polyphenylenephthalamide-based polymer, a polyester-based polymer, a polymethyl methacrylate-based polymer, a polyarylate-based polymer, a cinnamate-based polymer, a coumarin-based polymer, a phthalimidine-based polymer, a chalcone-based polymer, an aromatic acetylene-based polymer, etc. These may be used alone or in a combination thereof.

In some embodiments, the separation layer 50 may be formed on a carrier substrate (not illustrated) such as a glass substrate. A detaching process from the carrier substrate after forming the optical adjusting layer 130, the electrode pattern 140 and the insulation layer 150 may be facilitated by the separation layer 50.

The protective layer 60 may be formed to provide a protection of the electrode pattern 140 and a refractive index matching of the touch sensor. The protective layer 60 may be formed of an inorganic insulation material such as silicon oxide, silicon nitride or silicon oxynitride, and/or an organic insulation material including a polymer.

In some embodiments, the lower layer 110 of the optical adjusting layer 130 may also serve as a protective layer. In this case, the protective layer 60 may be omitted.

Figure 3:
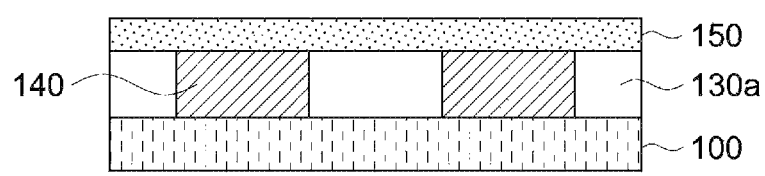
FIG. 3 is a schematic cross-sectional view illustrating a touch sensor in accordance with an exemplary embodiment.

FIG. 3 is a schematic cross-sectional view illustrating a touch sensor in accordance with an exemplary embodiment. Referring to FIG. 3, the touch sensor may include a substrate 100, an optical adjusting layer 130a, an electrode pattern 140 and an insulation layer 150.

The optical adjusting layer 130a may be formed on the substrate 100 as a pattern shape. For example, the optical adjusting layer 130a may have a structure in which the lower layer 100 may be omitted from the optical adjusting layer 130 of FIGS. 1 and 2. Accordingly, a thickness of the optical adjusting layer 130 may be reduced so that the touch sensor may become thinner.

The optical adjusting layer 130a may be interposed or inserted between the electrode patterns 140, and bottom surfaces of the optical adjusting layer 130a and the electrode pattern 140 may be substantially coplanar with each other. In an embodiment, the optical adjusting layer 130a may include a plurality of patterns isolated from each other between the electrode patterns 140.

In an embodiment, the touch sensor may be fabricated as a substrate-less type. For example, the optical adjusting layer 130a and the electrode pattern 140 may be formed on the protective layer 60 illustrated in FIG. 2.

Figure 4:
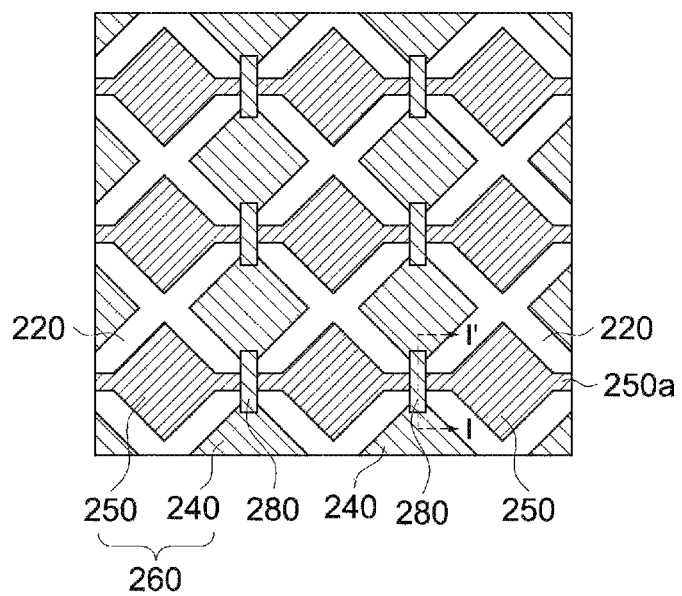
FIGS. 4 and 5 are a perspective view and a cross-sectional view, respectively, illustrating a touch sensor in accordance with an exemplary embodiment.
Figure 5:
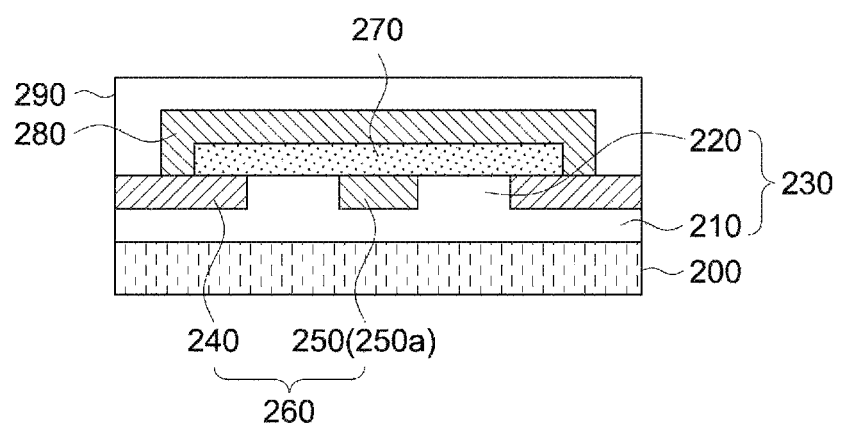

FIGS. 4 and 5 are a perspective view and a cross-sectional view, respectively, illustrating a touch sensor in accordance with an exemplary embodiment. Specifically, FIG. 5 is a cross-sectional view taken along a line I-I' of FIG. 4.

Referring to FIGS. 4 and 5, the touch sensor may include an optical adjusting layer 230 formed on a substrate 200. The optical adjusting layer 230 may include a lower layer 210 and a protrusion 220. The electrode patterns 260 may be formed on the optical adjusting layer 230, and the protrusion 220 of the optical adjusting layer 230 may be inserted between the neighboring electrode patterns 260. In some embodiments, the electrode pattern 230 may be at least partially surrounded by the protrusions 220.

The electrode patterns may include sensing electrodes arranged in different directions on the same plane. For example, first sensing electrodes 240 (e.g., arranged in a Y-axis direction) and second sensing electrodes 250 (e.g., arranged in an X-axis direction) may be arranged in two crossing directions.

The first sensing electrode 240 and the second sensing electrode 250 may be configured to provide information of X and Y coordinates of a touched area. For example, when a human hand or an object touches a cover window substrate, a capacitance change according to the touched area may be transferred to a driving circuit via the first sensing electrode 240, the second sensing electrode 250 and a position detection line. Subsequently, the capacitance change may be converted to an electrical signal so that the touched area may be detected.

Each first sensing electrode 240 may have an island shape. The second sensing electrodes 250 may be connected to each other along a row direction (e.g., the X-axis direction) via a connection portion 250a.

If the first sensing electrode 240 and the second sensing electrode 250 are disposed at the same level, a bridge electrode 280 connecting the neighboring first sensing electrodes 240 while insulating the first sensing electrode 240 from the second sensing electrode 250 may be further formed. The bridge electrode 280 may electrically connect the first sensing electrodes 240 neighboring in a column direction (e.g., the Y-axis direction).

As illustrated in FIG. 5, an insulation layer 270 may be formed on, e.g., the connection portion 250a and the protrusion 220 of the optical adjusting layer 230, and may partially cover a pair of the first sensing electrodes 240 neighboring each other.

The bridge electrode 280 may be disposed on the insulation layer 270 such that the pair of the first sensing electrodes 240 may be electrically connected to each other. For example, the bridge electrode 280 may cross the connection portion 250a on the insulation layer 270.

In some embodiments, contact holes may be formed through the insulation layer 270 to partially expose top surfaces of the pair of the first sensing electrodes 240. The bridge electrode 280 may be formed on the insulation layer 270 to fill the contact holes.

The bridge electrode 280 may include a conductive material substantially the same as or similar to that of the electrode pattern 260. In some embodiments, the bridge electrode 280 may have a multi-layered structure including a plurality of metal layers.

In some embodiments, the first sensing electrode 240 and the second sensing electrode 250 may be formed at different levels. For example, one of the first sensing electrode 240 and the second sensing electrode 250 may be formed on the insulation layer 270. In this case, the bridge electrode 280 may be omitted, and the first and second sensing electrodes 240 and 250 may include connection portions.

A passivation layer 290 may be formed on the bridge electrode 280. The passivation layer 290 may cover the electrode patterns 260, the optical adjusting layer 230 and the insulation layer 270. The passivation layer 290 may include an inorganic insulation material such as silicon oxide or an organic insulation material.

As described with reference to FIG. 1, the optical adjusting layer 230 may include a material or a composition having a refractive index greater than that of the insulation layer 270, and thus the refractive index of the optical adjusting layer 230 may become closer to that of the electrode pattern 260. In some embodiments, a refractive index difference between the electrode pattern 260 and the optical adjusting layer 230 may be 0.3 or less.

The protrusion 220 of the optical adjusting layer 230 may be disposed between the electrode patterns 260 at the same level as that of the electrode pattern 260 so that a transmittance reduction due to a refractive index change at an electrode layer or a touch sensor layer may be suppressed or minimized.

The insulation layer 270 having a refractive index smaller than those of the electrode pattern 240 and the optical adjusting layer 230 may be disposed on the electrode pattern 240. Thus, a refractive index change by the insulation layer 270 may be reduced to prevent the electrode patterns 260 from being viewed by a user.

As described above, a thickness of the protrusion 220 may be in a range from about 80% to about 140% of a thickness of the electrode pattern 260 so that a transmittance at the electrode layer or the touch sensor layer may be further enhanced.

In some embodiments, as illustrated in FIG. 3, the lower layer 210 may be omitted from the optical adjusting layer 230 such that the optical adjusting layer 230 may be provided as an insertion or protruding pattern.

According to exemplary embodiments, a touch screen panel including the touch sensor as described above is also provided. For example, elements or structures commonly known in the related art may be combined with the touch sensor to provide the touch screen panel.

According to an exemplary embodiment, an image display device including the touch screen panel is also provided. The touch sensor according to an exemplary embodiment may be applied to various image display devices including a liquid crystal display (LCD) device, a plasma display panel (PDP) device, an electroluminescent (EL) display device, an organic light emitting diode (OLED) display device, etc. For example, the touch sensor may be employed as a touch pattern or a touch sensor layer of a flexible display device so that an image display device having high transparency and flexibility with a small thickness may be achieved.

Hereinafter, preferred embodiments are proposed to more concretely describe the present invention. However, the following examples are only given for illustrating the present invention and those skilled in the related art will obviously understand that these examples do not restrict the appended claims but various alterations and modifications are possible within the scope and spirit of the present invention. Such alterations and modifications are duly included in the appended claims.

Experimental Example 1: Evaluation of Transmittance According to Refractive Indexes Examples 1 to 3

A photo-curable composition including an organic binder and a zirconia particle mixed therein was coated on a glass substrate to form a coating layer having a thickness of 0.19 μm. The coating layer was patterned to form an optical adjusting layer including a plurality of patterns. ITO was deposited on the optical adjusting layer to form electrode patterns between the patterns of the optical adjusting layer, and then an acryl resin was coated on the electrode patterns and the optical adjusting layer to form an insulation layer having a thickness of 3 μm.

An amount of the zirconia particle was controlled to change a refractive index of the optical adjusting layer to obtain touch sensor samples of Examples 1 to 3.

Example 4

A photo-curable composition including an organic binder and a zirconia particle mixed therein was coated on a glass substrate to form an optical adjusting layer having a thickness of 0.19 μm. An upper portion of the optical adjusting layer was partially removed by a halftone exposure and a developing process to form protrusions having a thickness of 0.14 μm. ITO was deposited on the optical adjusting layer to form electrode patterns between the protrusions, and an acryl resin was coated on the electrode patterns and the protrusions to form an insulation layer having a thickness of 3 μm.

Comparative Example

A photo-curable composition including an organic binder and a zirconia particle mixed therein was coated to form an optical adjusting layer having a thickness of 0.05 μm, and then electrode patterns having a thickness of 0.14 μm was formed on the optical adjusting layer by depositing ITO. An acryl resin was formed on the electrode patterns to form an insulation layer having a thickness of 3 μm from a top surface of the electrode pattern. The insulation layer was formed to fill spaces between the neighboring electrode patterns.

Transmittances of the touch sensor samples according to Examples and Comparative Example were measured, and the results are shown in Table 1 below. Specifically, an average value of a transmittance at an electrode region including the electrode pattern and a transmittance at a non-electrode region was calculated to be provided in Table 1.

TABLE 1

|  | Example 1 | Example 2 | Example 3 | Example 4 | Comparative Example |
|---|---|---|---|---|---|
| Refractive Index of Electrode Pattern (A) | 1.9 | 1.9 | 1.9 | 1.9 | 1.9 |
| Refractive Index of Optical Adjusting Layer (B) | 1.67 | 1.65 | 1.57 | 1.67 | 1.67 |
| Refractive Index Difference (A − B) | 0.23 | 0.25 | 0.33 | 0.23 | 0.23 |
| Refractive Index of Insulation Layer | 1.5 | 1.5 | 1.5 | 1.5 | 1.5 |
| Transmittance (%) | 93.01 | 92.05 | 91.65 | 93.20 | 87.71 |

Referring to Table. 1, the touch sensor samples of Examples in which the optical adjusting layer was inserted between the electrode patterns had transmittances greater than that of Comparative Example in which the insulation layer was formed between the electrode patterns.

In Example 3 having the refractive index difference greater than 0.3, the transmittance was reduced compared to those of Examples 1 and 2. In Example 4 in which the optical adjusting layer was formed to include the lower layer and the protrusion, a refractive index change between the electrode pattern and the substrate was buffered by the lower layer so that more improved transmittance was obtained.

Experimental Example 2: Evaluation of Transmittance According to Thickness of Protrusion Touch sensors were fabricated by methods substantially the same as or similar to those of Examples 1 to 3 in Experimental Example 1. Specifically, a refractive index of an optical adjusting layer was adjusted to 1.67, a refractive index of an electrode pattern including ITO was adjusted to 1.9, and a refractive index of an insulation layer was adjusted to 1.5.

A thickness of the electrode pattern was fixed to 0.135 μm. A transmittance difference between an electrode region and a non-electrode region was measured while changing a thickness of the optical adjusting layer between the electrode patterns. The results are shown in Table 2 below.

TABLE 2

|  | 1 | 2 | 3 | 4 | 5 | 6 | 7 | 8 | 9 | 10 |
|---|---|---|---|---|---|---|---|---|---|---|
| Thickness of Electrode Pattern (μm) | 0.135 | 0.135 | 0.135 | 0.135 | 0.135 | 0.135 | 0.135 | 0.135 | 0.135 | 0.135 |

TABLE 2-continued

| | 1 | 2 | 3 | 4 | 5 | 6 | 7 | 8 | 9 | 10 |
|---|---|---|---|---|---|---|---|---|---|---|
| Thickness of Protrusion (μm) | 0.04 | 0.08 | 0.11 | 0.14 | 0.15 | 0.16 | 0.17 | 0.18 | 0.19 | 0.2 |
| Thickness Ratio of Protrusion (%) | 29.6 | 59.2 | 81.5 | 103.7 | 111.1 | 118.5 | 126 | 133.3 | 140.7 | 148.1 |
| Transmittance at Non-Electrode Region (%) | 90.00 | 87.72 | 90.49 | 91.13 | 91.71 | 92.01 | 92.01 | 91.72 | 91.18 | 90.00 |
| Transmittance at Electrode Region (%) | 91.8 | 91.8 | 91.8 | 91.8 | 91.8 | 91.8 | 91.8 | 91.8 | 91.8 | 91.8 |
| Transmittance Difference | −1.8 | −4.09 | −1.31 | −0.67 | −0.1 | 0.21 | 0.21 | −0.08 | −0.62 | −1.8 |

Referring to Table 2 above, the transmittance difference between the non-electrode region and the electrode region was below about 1.3 (based on an absolute value) when the thickness ratio of the optical adjusting layer formed between the electrode patterns was in a range from about 80% to 140% (e.g., columns 3 to 9 in Table 2) so that visibility of the electrode patterns due to the transmittance difference was avoided.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A touch sensor, comprising:
   an optical adjusting layer comprising a lower layer and a protrusion protruding from the lower layer;
   electrode patterns disposed on the lower layer and isolated with respect to the protrusion; and
   an insulation layer directly covering at least a portion of each of the electrode patterns and the optical adjusting layer, the insulation layer having a refractive index less than that of the optical adjusting layer,
   wherein a thickness ratio of the protrusion to the electrode pattern is in a range from about 103.7% to about 140.7%;
   the optical adjusting layer insulates each of the electrode patterns; and
   a refractive index difference between the electrode pattern and the optical adjusting layer is less than 0.3.

2. The touch sensor according to claim 1, wherein the lower layer and the protrusion are integrally connected to each other.

3. The touch sensor according to claim 1, wherein the optical adjusting layer includes a plurality of the protrusions, and a recess is defined by a top surface of the lower layer and neighboring ones of the protrusions.

4. The touch sensor according to claim 3, wherein each of the electrode patterns is disposed in the recess.

5. The touch sensor according to claim 1, wherein the optical adjusting layer includes a plurality of the protrusions, and the electrode patterns are surrounded partially or wholly by the protrusions.

6. The touch sensor according to claim 1, wherein the optical adjusting layer includes patterns isolated from each other and interposed between the electrode patterns.

7. The touch sensor according to claim 1, wherein the optical adjusting layer includes an inorganic particle dispersed in an organic binder.

8. The touch sensor according to claim 1, wherein a refractive index difference between the electrode pattern and the insulation layer is 0.3 or more.

9. The touch sensor according to claim 1, wherein the electrode patterns include first sensing electrodes and second sensing electrode arranged along different direction crossing each other.

10. The touch sensor according to claim 9, further comprising a bridge electrode electrically connecting neighboring ones of the first sensing electrodes while insulating the first sensing electrodes from the second sensing electrodes.

11. The touch sensor according to claim 10, wherein the bridge electrode is disposed on the insulation layer.

12. The touch sensor according to claim 1, further comprising a transparent substrate on which the optical adjusting layer is formed.

13. The touch sensor according to claim 1, further comprising a protective layer and a separation layer sequentially formed from a bottom surface of the optical adjusting layer.

14. An image display device comprising the touch sensor according to claim 1.

* * * * *